(No Model.)

J. H. MORRIS.
GATE.

No. 520,533.   Patented May 29, 1894.

Witnesses
B. S. Ober
N. P. Riley

Inventor
John H. Morris
By his Attorneys
C. A. Snow & Co.

UNITED STATES PATENT OFFICE.

JOHN H. MORRIS, OF MAQUOKETA, IOWA.

GATE.

SPECIFICATION forming part of Letters Patent No. 520,533, dated May 29, 1894.

Application filed December 15, 1893. Serial No. 493,790. (No model.)

*To all whom it may concern:*

Be it known that I, JOHN H. MORRIS, a citizen of the United States, residing at Maquoketa, in the county of Jackson and State of Iowa, have invented a new and useful Gate, of which the following is a specification.

The invention relates to improvements in gates.

The object of the present invention is to improve the construction of gates, and to provide one adapted to be slightly elevated in order to pass over snow drifts without catching, and capable of being tilted upward to pass an obstruction or to swing up a hill, or depressed to enable it to rest upon the ground to hold it when open.

The invention consists in the construction and novel combination and arrangement of parts hereinafter fully described, illustrated in the accompanying drawings, and pointed out in the claims hereto appended.

Figure 1:
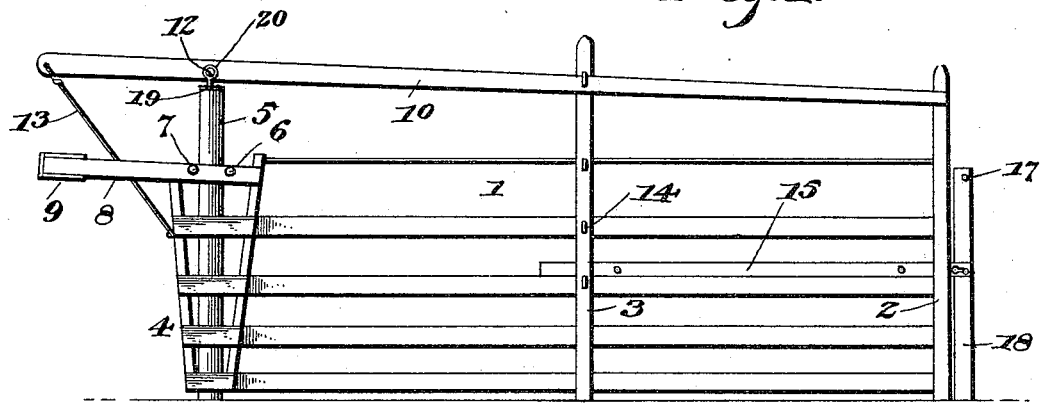
Figure 2:
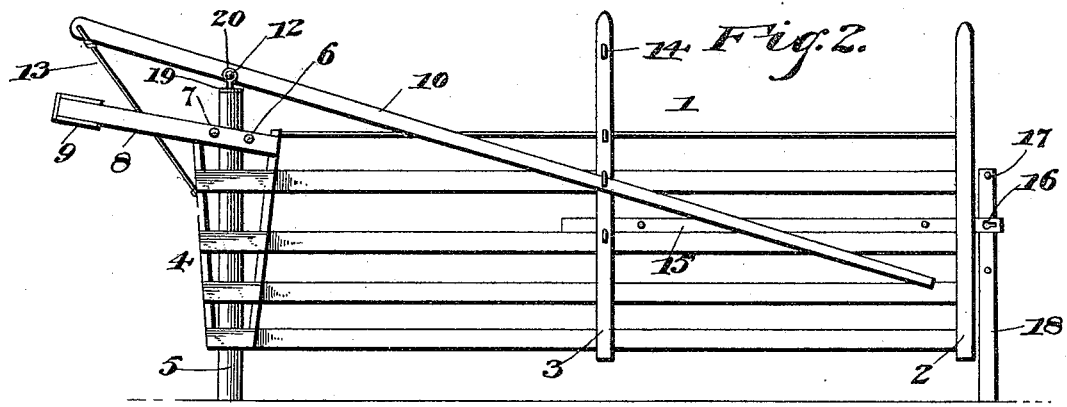
Figure 3:
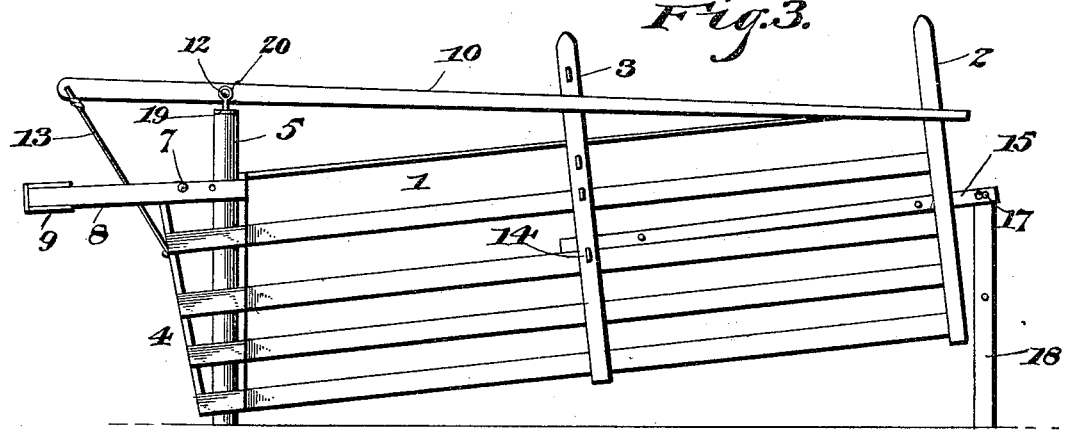
Figure 4:
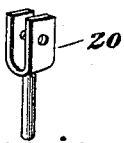

In the drawings—Figure 1 is a side elevation of a gate constructed in accordance with this invention, and shown in its normal position. Fig. 2 is a similar view showing the gate slightly elevated. Fig. 3 is an elevation, the gate being tilted. Fig. 4 is a detail view of the hanger.

Like numerals of reference indicate corresponding parts in all the figures of the drawings.

1 designates a swinging gate constructed of any suitable material, and consisting preferably of horizontal rails and vertical bars 2 and 3, and provided at its rear or inner end with a frame 4 to receive a hinge post 5. The frame 4 tapers, and increases in size from its bottom upward to enable the gate to be tilted upward as illustrated in Fig. 3 of the accompanying drawings.

The gate is maintained in a horizontal position by removable pins 6 and 7 located on opposite sides of the hinge or pivot post 5. The pin in advance of the post 5 when withdrawn permits the gate to be tilted upward; and when the other pin is withdrawn the gate may be depressed to cause its front end to rest upon the ground to anchor it at any desired point. Both pins may be removed, and the gate will maintain a horizontal position, and is counterbalanced by a rearwardly extending arm 8 projecting from the top of the frame and forming a continuation of the top pieces thereof, and provided at its outer end with a weight 9.

The gate is tilted or elevated as desired by means of a lever 10 disposed longitudinally of the gate at the top thereof and attached to the pivot post by an eye-bolt 11 and a bolt 12, whereby the lever is pivoted and adapted to swing horizontally with the gate, and is at the same time hinged, and is adapted to swing vertically. The rear end of the lever is connected with the back of the gate by a wire 13 or the like; and it is secured at any desired adjustment by means of a series of hooks 14, which are arranged vertically on the bar 3 of the gate. The bars 3 and 2 extend above the gate, and the lever terminates at its front end adjacent to the bar 2. The eye bolt 11 rests upon a washer 19, but any other suitable means may be employed for mounting the lever upon the pivot post, such as a hanger 20 Fig. 4.

The gate may be supported in a tilted position when closed by means of a sliding latch 15 provided at its outer end with an opening 16 adapted to engage a projection 17 at the top of a latch post 18.

It will be apparent that the gate is exceedingly simple and inexpensive in construction, that it is adapted to be readily operated, and that it is capable of swinging horizontally either in a lowered or elevated position, and that it may be tilted upward or depressed to clear an obstruction or to anchor it.

Changes in the form, proportion, and the minor details of construction may be resorted to without departing from the principle or sacrificing any of the advantages of this invention.

What I claim is—

1. The combination of a pivot post, a swinging gate provided at its rear end with a tapering frame receiving the pivot post, pins mounted on the frame and located at opposite sides of the pivot post, one of the pins being removable for the purpose shown, an arm extending from the top of the gate and provided with a counterbalancing weight, a lever fulcrumed on the pivot post and arranged above the gate and having its rear end connected with the latter, and means for detachably securing the front portion of the lever to the gate, substantially as described.

2. The combination of a pivot post, a gate provided at its rear end with a tapering frame receiving the pivot post, an arm extending rearward from the gate and provided with a counterbalancing weight, a vertical pivot mounted at the top of the pivot post, a lever hingedly connected with the pivot and adapted to swing vertically on the same, and to swing horizontally on the pivot post, and having its rear end connected with the gate, and a series of catches mounted on the gate for detachably engaging the lever, substantially as and for the purpose described.

In testimony that I claim the foregoing as my own I have hereto affixed my signature in the presence of two witnesses.

JOHN H. MORRIS.

Witnesses:
HENRY TAUBMAN,
FRANK DOUBRAWA, Jr.